United States Patent [19]
Ewer

[11] Patent Number: 5,199,271
[45] Date of Patent: Apr. 6, 1993

[54] AIR CONDITIONING SYSTEM HAVING TIMED OIL DRAIN SEPARATOR

[75] Inventor: John W. Ewer, San Antonio, Tex.

[73] Assignee: Zee Systems, Inc., San Antonio, Tex.

[21] Appl. No.: 645,223

[22] Filed: Jan. 24, 1991

[51] Int. Cl.$^5$ .............................. F25B 43/02
[52] U.S. Cl. ........................ 62/84; 62/193; 62/157; 62/231; 62/473
[58] Field of Search .............. 62/192, 193, 470, 84, 62/473, 468, 469, 231, 157

[56] References Cited

U.S. PATENT DOCUMENTS

| | | | |
|---|---|---|---|
| 3,280,576 | 10/1966 | Endress | 62/84 |
| 4,180,986 | 1/1980 | Shaw | 62/192 |
| 4,557,115 | 12/1985 | Nakamura | 62/193 X |
| 4,586,351 | 5/1986 | Igarashi et al. | 62/468 |
| 4,912,937 | 4/1990 | Nakamura et al. | 62/160 |
| 5,016,447 | 5/1991 | Lane et al. | 62/473 X |

Primary Examiner—Albert J. Makay
Assistant Examiner—J. Sollecito
Attorney, Agent, or Firm—Gunn, Lee & Miller

[57] ABSTRACT

An air conditioning system (10) for an aircraft, the air conditioning system (10) having a separator (14) located between the high pressure side of a compressor (12) and a condenser (18). A timer (34) activated normally open solenoid (32) is located on a separator drain line 28 to periodically dump the lubricant accumulated in the separator (14) back into the compressor (12).

19 Claims, 1 Drawing Sheet

AIR CONDITIONING SYSTEM HAVING TIMED OIL DRAIN SEPARATOR

FIELD OF THE INVENTION

The present invention relates to long reach air conditioning systems for use in general aviation aircraft. More particularly, the present invention relates to an air conditioning system with relatively long distances between the compressor/condenser and the evaporator and with a separator between the discharge of the compressor and the condenser. The separator is attached to a drain line which contains a timer activated solenoid valve which periodically dumps the accumulated lubricating fluid back into the compressor.

BACKGROUND

Compressors are employed within air conditioning systems for compressing refrigerants and circulating them through a condenser and an evaporator. In the condenser the gaseous refrigerant is condensed at high pressure. The liquid refrigerant enters the evaporator where the liquid evaporates and removes heat from the air conditioned space. The vapor is then returned to the suction or inlet side of the compressor to repeat the cycle.

Conventionally, some lubricating oil from the compressor invariably escapes to the refrigerant circuit. To insure proper lubrication, this lubricant must be returned to the compressor oil sump. The return of this lubricant by normal circuit gas flow is accomplished if circuit factors such as length and elevation of circuit and gas flow are favorable. Conventionally, when the above mentioned circuit conditions are not favorable, an oil separator (located at or near the compressor discharge) separates the oil from the refrigerant. The accumulated oil from the separator is then returned by various means into the compressor inlet gas stream where it returns to the compressor oil sump. The efficiency and means of the oil return to the compressor oil sump is dependent on internal compressor design.

For example, U.S. Pat. No. 4,912,937 (Nakamura 1990) discloses an air conditioning system with an oil separator which shunts oil discharged from the compressor back to the suction end of the compressor. A switch in the separator signals a solenoid when the accumulated oil reaches a predetermined maximum. The solenoid opens the drain line to allow the return of lubricating fluid to the compressor inlet.

U.S. Pat. No. 3,280,576 (Endress 1966) discloses a complex refrigeration system which includes a method and apparatus for lubrication that is designed to prevent oil foaming due to oil sump pressure changes when system is operated after a shut-down. The system provides for an oil pump to maintain positive oil pressure. Thus, Endress discloses a lubricating system that, to prevent foaming, isolates the sump oil from the remainder of the system during shut-down periods.

U.S. Pat. No. 4,180,986 (Shaw 1980) discloses a constant operation refrigeration system employing a compressor by-pass to reduce compressor capacity. Evaporator conditions control the reduced capacity cycle and at the same time call for a reduced oil flow by engaging a solenoid which places a restrictor in the oil supply line to the compressor. Upon return to full capacity operation, the solenoid circuit returns the lubrication system to full flow. The primary function of such a system is to conserve oil during reduced system loads for use when increased system loads are required. Evaporator pressures reflect refrigeration load conditions and are thereby used to signal reduced compressor capacity and reduced oil flow cycle.

None of the present systems provide "fail-safe" lubrication under conditions peculiar to aircraft air conditioning systems, specifically: (1) limited compressor weight (five to thirteen pounds); (2) limited compressor cooling capabilities (one to three tons); (3) relatively long circuits (generally exceeding 15 feet between the compressor/condensor and the evaporator); (4) extreme elevation variations; (5) variable gravity conditions (both positive and negative "g" loads); (6) use of hose instead of pipe; (7) limited compressor lubricating oil capacity (generally three to ten ounces). These factors require long reach aircraft air conditioning systems with only a few ounces of lubricating oil, a compressor mounted high relative to other circuit components, utilized under variable gravitational conditions. Moreover, the use of hosing instead of pipe produces a greater potential for residue and traps. These conditions demand that almost no oil be permitted to enter the circuit because such escaped oil will not readily return to the compressor oil sump. An oil separator must be employed in the gas discharge line adjacent to the compressor to provide for the return of the separated oil back to the compressor crankcase by the most direct means.

SUMMARY OF THE INVENTION

It is the primary purpose of the present invention to provide for an air conditioning system compatible with general aviation aircraft which system contains an oil separator with a timer activated solenoid to periodically return, through a drain line, lubricant from the separator directly to the crankcase or sump of the compressor.

It is another purpose of the present invention to provide for a fail-safe system that will lubricate compressors even upon failure of the solenoid-timer electrical system.

It is another purpose of the present invention to provide for a lubrication oil drain line that directly injects oil supplied from the separator into the crank-case of a piston-type compressor.

It is another purpose of the present invention to provide for periodic dumping of separated lubrication fluid through a normally open solenoid actuated valve into the compressor.

It is another purpose of the present invention to provide for lubrication in an air conditioning system of an aircraft containing a splash lubricated compressor which uses a lubricating oil that is miscible with the refrigerant.

It is another purpose of the present invention to provide for a solenoid valve operated drain line, which line directly connects the separator to the crankcase of the compressor.

It is yet another purpose of the present invention to provide for an air conditioning system for use with aircraft, which system allows for a minimum of separated oil accumulation prior to return cycling.

Thus, the present invention provides a normally open solenoid valve operated by an electrical timer to open the oil return line from the separator to the compressor crankcase (oil sump) at predetermined intervals.

DRAWINGS

FIG. 1 is a diagram of the air conditioning system of the present invention.

DETAILED DESCRIPTION OF THE PREFERRED EMBODIMENT OF THE PRESENT INVENTION

Figure 1:
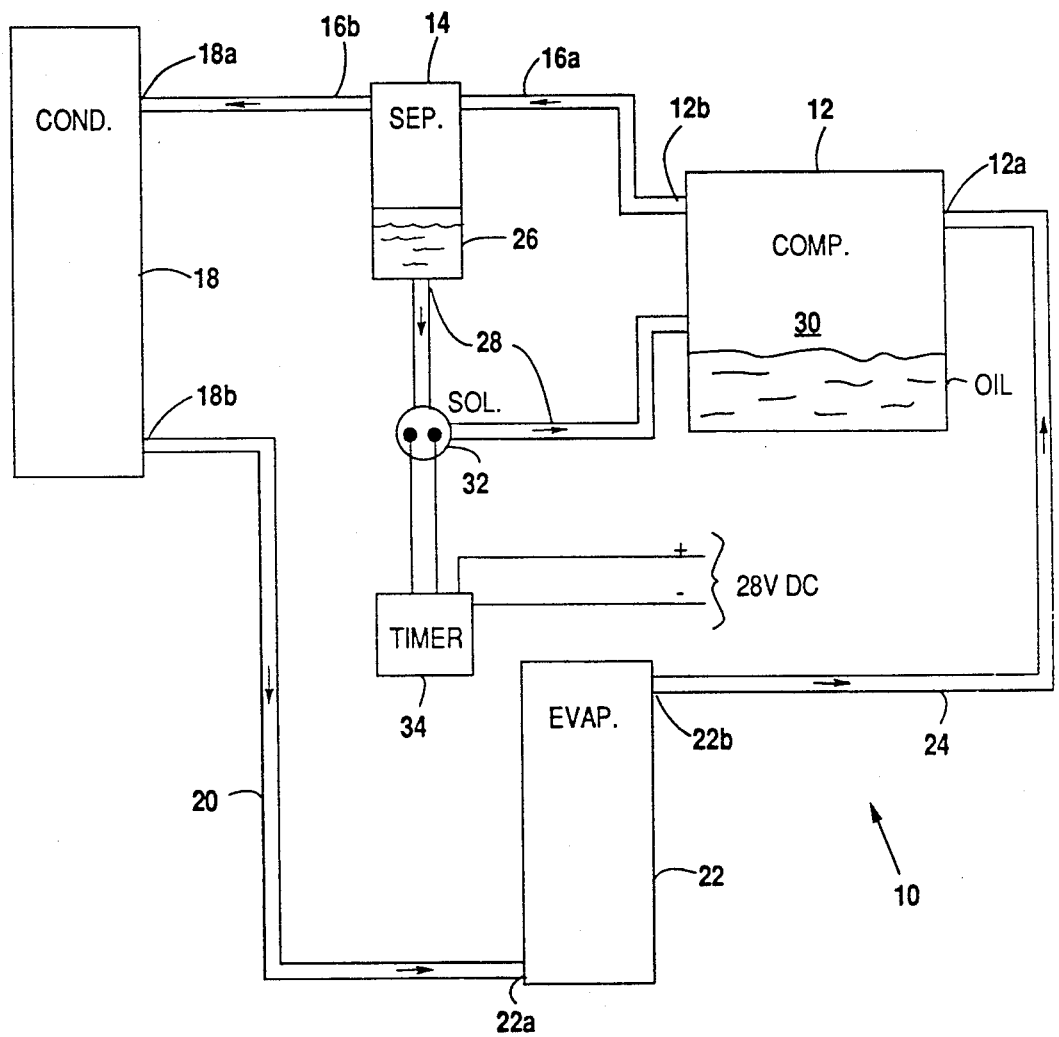

FIG. 1 is a diagram of air conditioning system (10). Compressor (12) has low end (suction) (12a) and high end (12b). Separator (14) is located in line (16a) and (16b) between compressor (12) and condenser (18). Lines (16a) and (16b) tie compressor (12) into condenser (18) at inlet (18a). Line (20) ties into outlet (18b) of condenser (18) and into high end (22a) of evaporator (22). Low end (22b) of evaporator (22) is connected to suction (12a) of compressor (12) through return line (24).

Separator (14) contains reservoir (26) which accumulates lubricating oil removed from line (16a). Compressor (12) contains sump or crankcase (30) into which lubricating oil is injected and stored. Drain line (28) returns lubricating oil to sump or crankcase (30) for splash lubrication of compressor (12). Solenoid valve (32) controls the flow of lubricating oil through drain line (28) by periodically opening. Timer (34) is connected to solenoid (32) and the aircraft's electrical system and set to close the normally open solenoid except during periodic dump cycles when drain line (28) is momentarily open to replenish lubricating oil in crankcase or sump (30). The term periodically as used herein means a preset time-controlled period between dump cycles. Light-weight piston-type compressors, (those without pressurized lubrication systems) are intended for use with the present invention. That is, piston-type compressors having splash system lubrication, such as those containing crankcases or sumps, are intended for use with the present invention.

A type of compressor that has proven satisfactory is the Climate Control (formerly York Automotive) Part No. CF 206R, (Climate Control is a division of Borg Warner, Decatur, Ill.). This compressor is a piston-type compressor and driven by a four h.p. electric motor. The capacity of the crankcase is approximately five to ten ounces.

A separator that has proved satisfactory is that manufactured by Wilkerson as Model F 26-03-MOO ⅜" B88. This separator allows for the temporary storage of lubricating oil in reservoir (26).

A solenoid that has proven satisfactory is the two-way solenoid, normally open, available from Airmatic-Allied, Inc., Wilmington, Ohio as Part No. 20493. Other solenoids that have proven satisfactory are those available from Jackes-Evans, Madison, Miss., as Part No. ORB1P2 or from Snap-Tite, Inc. of Erie, Pa. The solenoid and the timer are designed to operate on the 26-28 volt DC electrical systems found in general aviation aircraft. The solenoid is generally 11 watts power of the series type-coil.

Optimally the solenoid has approximately a 0.090-inch (two ton system) orifice (generally in the 0.080 to 0.100 range). The aircraft electrical power supply may be connected to a terminal from which both the electric motor of the compressor and (through the timer) the solenoid operate. The use of a normally open solenoid valve insures that electrical failure in the solenoid/timer portion of the system while the compressor is still operating will allow a continual flow of lubricating oil back to the compressor, thus providing a fail-safe backup to prevent inadequate lubrication of the compressor. The use of the orifice size indicated allows sufficient lubrication of the compressor, yet minimizes gas by-pass during such electrical failure. In the preferred embodiment, the timer is preset to 20-minute intervals allowing approximately one to three ounces of lubrication oil to accumulate in the reservoir of the separator before opening the drain line.

The normally open solenoid draws its electrical power (through the timer) from the aircraft's electrical supply system. This permits a separator to compressor oil return cycle at system shut down. Additionally, the normally open fail-safe feature protects the compressor from oil starvation in the event of electrical failure of the solenoid or associated electrical circuitry. Consistent with this failsafe intent the solenoid features an orifice which is sized large enough to escape plugging and small enough to minimize gas by-pass during extended operation with solenoid electrical failure and resultant gas flow through the open drain line (an approximately 0.090 orifice has proven satisfactory). The timed solenoid openings are adjusted to permit a minimum of oil accumulation (one to three ounces) in the separator before direct return to the crankcase of the compressor.

Timers that have proven satisfactory are those provided by Syrelec Corporation of Kelton, Tex. available through Ray Electronics, 127 Braniff, San Antonio, Tex. As with the solenoids, the timers are designated to operate off 26-28 volt DC systems commonly found in general aviation aircraft.

OPERATION

The "splash" type lubrication system of compressor (12) mixes some refrigerant with the miscible lubricating oil. The mixture enters line (16a) at high end (12b) and continues until it reaches separator (14). Separator (14) removes the lubricating oil from the refrigerant and stores it as a liquid, under high pressure, in reservoir (26). Timer (34) is set to periodically activate solenoid (32) every 15 to 25 minutes for a one- to two-second interval during which lubricating oil is forced from (high pressure) reservoir (26), through drain line (28) into crankcase or sump (30). That is, the high pressure in separator (14) combined with low pressure in sump (30) will create a pressure differential sufficient to rapidly force the lubricating oil through drain line (28). Tests have shown that, in using systems with small compressor oil capacity, generally in the range of five to ten ounces of lubricating oil, the clearance of the accumulated oil from the separator is preferably accomplished by a dump period of one to two seconds every 20 minutes. This allows the several ounces of stored lubricating oil to be returned to the compressor.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described in connection with the preferred embodiment, it is not intended to limit the invention to a particular form set forth, but on the contrary, it is intended to cover such alternatives, modifications, and equivalents as may be included within the spirit and the scope of the invention as defined by the appended claims.

I claim:

1. An air conditioning system for use with general aviation aircraft, the system utilizing a lubricating oil and a refrigerant, the system comprising:
   a compressor;
   a condenser;
   an evaporator;
   a separator between said compressor and said condenser, said separator for removing the lubricating oil from the refrigerant and storing the lubricating oil;
   a drain line between said separator and said compressor;
   a solenoid valve in said drain line, said solenoid valve to normally close said drain line; and
   a timer connected to said solenoid valve to periodically open said drain line;
   wherein the periodic opening of said drain line allows the lubricating oil in said separator to be forced into said compressor, thereby facilitating lubrication of said compressor.

2. The system as described in claim 1, wherein said timer is set to periodically open said drain line for a period of one to two seconds every 15 to 25 minutes.

3. The system as described in claim 1, wherein said timer is designed to open for about a 1.5-second duration approximately every 20 minutes.

4. The system as described in claim 1, wherein said compressor, said solenoid and said timer are all driven by the electrical power supply of the aircraft.

5. The system as described in claim 1, wherein said timer and said solenoid are electrically connected to the aircraft's electrical system such that electrical shutdown will open said solenoid valve for the duration of such electrical shutdown.

6. The system as described in claim 5, wherein the failure of the electrical power to said solenoid causes said solenoid valve to open and remain open.

7. The system as described in claim 1, wherein said solenoid valve contains an orifice in the range of 0.080" to 0.100".

8. The system as described in claim 1, wherein said compressor weighs between five and thirteen pounds and has a one to three ton minimum cooling capacity.

9. The system as described in claim 1, wherein the distance between said evaporator and one of either said compressor or said condenser is in excess of 15 feet.

10. The system as described in claim 1, wherein said compressor contains a sump with an oil capacity of between two and ten ounces, and said drain line is connected directly to the sump of said compressor.

11. The system as described in claim 2, wherein said compressor weighs between five and thirteen pounds and has a one to three ton cooling capacity.

12. The system as described in claim 2, wherein the distance between said evaporator and one of either said compressor or said condenser is in excess of 15 feet.

13. The system as described in claim 2, wherein said compressor contains a sump with an oil capacity of between two and ten ounces and said drain line is connected directly to the sump of said compressor.

14. A device for air conditioning an aircraft, the device comprising:
   a compressor having sump for storing lubricating fluid and weighing between 5 and 13 pounds and having a cooling capability of, at the minimum between 1 and 3 tons;
   an electric motor for driving said compressor;
   a condenser;
   an evaporator;
   a hose connecting said compressor, said condenser and said evaporator, said hose for carrying a refrigerant;
   a separator located in said hose between said compressor and said condenser, said separator for removing the lubricating fluid from the refrigerant and temporarily storing the accumulated lubricating fluid;
   a drain line between said separator and the sump of said compressor;
   a solenoid valve in said drain line; and
   an electrically driven timer connected to said solenoid valve set to periodically open said drain line for a period of one to two seconds every 15 to 25 minutes;
   wherein the periodic opening of said drain line allows the fluid in said separator to be forced into the sump of said compressor.

15. The device of claim 14 wherein said solenoid valve is normally open and wired to said timer, which timer is wired to the aircraft's electrical system such that failure of the electrical system opens said drain line and allows the lubrication fluid to return to the sump.

16. The device of claim 14 wherein the failure of electrical current to said solenoid will open said solenoid and allow the lubrication fluid to return to the sump of said compressor.

17. An improved method for air conditioning space within a general aviation aircraft using an air conditioning system lubricated by an oil miscible with a refrigerant, and having a compressor, a condenser, and an evaporator, the system further having a separator between the compressor and the condenser, the separator containing a drain line to the compressor, the drain line having a timer actuated normal open solenoid valve, the method comprising:
   compressing the gaseous refrigerant, said compressing step including the admixing of a portion of the lubricating oil with the refrigerant;
   expelling the admixed composition from the compressor at the high end thereof;
   separating the lubricating oil from the refrigerant;
   storing the separated lubricating oil;
   condensing said refrigerant from a gas to a liquid;
   evaporating said refrigerant in the evaporator, while passing air from the air conditioned space through the evaporator;
   returning said refrigerant to an inlet of the compressor; and
   periodically returning the stored lubricating oil to the compressor through the drain line.

18. The method as described in claim 17 wherein the stored lubricating oil is returned to the compressor approximately ever 20 minutes.

19. The method of claim 17 wherein the lubricating oil is returned to the compressor every 15 to 25 minutes by opening the valve for a duration of one to two seconds.

* * * * *